United States Patent
Kong et al.

(10) Patent No.: US 6,815,239 B1
(45) Date of Patent: Nov. 9, 2004

(54) PHOTOLITHOGRAPHIC METHODS FOR MAKING LIQUID-CRYSTAL-ON-SILICON DISPLAYS WITH ALIGNMENT POSTS AND OPTICAL INTERFERENCE LAYERS

(75) Inventors: Sik On Kong, Singapore (SG); Rajan Rajgopal, Singapore (SG); George Wong, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 0 days.

(21) Appl. No.: 09/262,000

(22) Filed: Mar. 5, 1999

(51) Int. Cl.[7] .............................................. H01L 21/00
(52) U.S. Cl. ........................... 438/25; 438/26; 438/29; 438/116; 257/59; 257/72; 349/155; 349/156
(58) Field of Search ................................ 438/25, 26, 29, 438/116; 257/59, 72; 349/155, 156

(56) References Cited

U.S. PATENT DOCUMENTS

| | | | | |
|---|---|---|---|---|
| 4,763,995 A | * | 8/1988 | Katagiri et al. ............. 349/156 |
| 4,827,870 A | * | 5/1989 | Lee ............................. 118/665 |
| 5,379,139 A | * | 1/1995 | Sato et al. .................... 259/81 |
| 5,498,925 A | | 3/1996 | Bell et al. .................... 313/497 |
| 5,581,378 A | * | 12/1996 | Kulick et al. .................. 359/9 |
| 5,597,736 A | | 1/1997 | Sampsell ...................... 437/2 |
| 5,706,067 A | * | 1/1998 | Colgan et al. ............... 349/114 |
| 5,744,824 A | | 4/1998 | Kousai et al. ................ 257/74 |
| 5,748,828 A | | 5/1998 | Steiner et al. ............. 385/146 |
| 5,764,324 A | * | 6/1998 | Lu et al. ...................... 349/113 |
| 5,801,800 A | * | 9/1998 | Wright et al. ................ 349/77 |
| 5,831,710 A | * | 11/1998 | Colgan et al. .............. 349/156 |
| 5,982,472 A | * | 11/1999 | Moore ........................ 349/156 |
| 6,027,999 A | * | 2/2000 | Wong ......................... 438/637 |
| 6,051,446 A | * | 4/2000 | Moore et al. ................. 438/36 |
| 6,061,114 A | * | 5/2000 | Callegari et al. ........... 349/125 |
| 6,124,912 A | * | 9/2000 | Moore ........................ 349/113 |
| 6,252,999 B1 | * | 6/2001 | Haskell et al. ............... 385/14 |
| 6,266,121 B1 | * | 7/2001 | Shigeta et al. ............. 349/156 |
| 6,449,024 B1 | * | 9/2002 | Hirakata et al. ............. 349/86 |

* cited by examiner

*Primary Examiner*—Amir Zarabian
*Assistant Examiner*—Jeff Vockrodt
(74) *Attorney, Agent, or Firm*—George O. Saile; Rosemary L.S. Pike

(57) ABSTRACT

Five new methods for the formation of an improved liquid-crystal-on-silicon display are described, in which the device structure is enhanced by the photolithographic building of alignment posts among the mirror pixels of the micro-display. These five methods accommodate the fabrication of an optical interference multilayer, which improves the image quality of the reflected light. These five methods are:

Silicon Dioxide Posts by Wet Etching.
Amorphous Silicon Posts by Plasma Etching.
Silicon Nitride Posts by Plug Filling.
Insulation Material Posts by Lift-off.
Polyimide Posts by Photosensitive Etching.

11 Claims, 8 Drawing Sheets

PHOTOLITHOGRAPHIC METHODS FOR MAKING LIQUID-CRYSTAL-ON-SILICON DISPLAYS WITH ALIGNMENT POSTS AND OPTICAL INTERFERENCE LAYERS

This Application is related to patent application Ser. No. 09/262,910 Su Yong Jie, Ravi Sankav and Han Zhi Ciang filed on Mar. 5, 1999 and to Ser. No. 09/259,778 by Sudipto R. Roy filed on Mar. 1, 1999, all of Chartered Semiconductor Manufacturing LTD of Singapore Technologies.

BACKGROUND OF THE INVENTION (1) Field of the Invention

This invention relates to new methods of photolithographic fabrication of alignment posts and optical interference layers directly on liquid-crystal-on-silicon displays.

(2) Description of the Prior Art

The picture quality of liquid crystal displays that are created using as simple a design as seven segments to complex designs using millions of pixels is determined by the structure that is used to control the variation of the height of the pixels and the location of the external wires after wafer processing has been completed. There are known processes for creating insulating alignment posts based on preformed glass micro-spheres and rods; relatively low series resistance posts can be obtained by means of selective deposition of polysilicon and metallic silicide. (The making of metallic vias and contacts is a comparatively well known processing art.)

U.S. Pat. No. 5,498,925 to Bell et al describes the formation of posts in flat panel displays using processes based on a heat-treated slurry or paste upon a glass plate. U.S. Pat. No. 5,597,736 teaches the function of a light-blocking layer deposited upon a semiconductor substrate material that can emit light. U.S. Pat. Nos. 5,744,824 and 5,748,828 show various LCD structures and external optics.

Until now, it has been difficult to construct alignment posts using photolithography and also add optical interference layers simultaneously onto a semiconductor substrate material used to control the gray-level of each pixel.

BRIEF SUMMARY OF THE INVENTION

A principal object of the present invention is to describe various new methods for building a flat-panel liquid-crystal display upon an integrated circuit (IC) die with inter-related alignment between the posts supporting the overlaying glass cover plate and optical interference layers employed to improve image quality.

Another object of this invention is to describe effective and very manufacturable methods of photolithographic formation of insulating alignment posts (also called studs or pillars). These methods can be used in processing many different device types, and are described in this application for liquid crystal display devices as a way of illustrating their embodiment at a pixel density beyond that achievable with preformed micro-glass spheres and rods.

A further object of the present invention is to describe methods of deposition for both the posts and the optical interference layers that are independent of each other and retain their desired feature during deposition of subsequent features. The various methods are classified into five method categories: 1) silicon oxide wet etching; 2) amorphous silicon plasma etching; and 3) nitride plug filling; 4) insulating material lift-off; 5) photosensitive polyimides.

Five new methods for the formation of an improved liquid-crystal-on-silicon display are described, in which the device structure is enhanced by the photolithographic building of alignment posts among the mirror pixels of the micro-display. At the same time these five methods accommodate the fabrication of an optical interference multilayer that improves the image quality of the reflected light. These five methods are:

Silicon Dioxide Posts by Wet Etching—wherein said alignment posts are formed by the process of silicon dioxide wet etching upon the said silicon substrate.

Amorphous Silicon Posts by Plasma Etching—wherein said alignment posts are formed by the process of amorphous silicon plasma etching upon the said silicon substrate.

Silicon Nitride Posts by Plug Filling—wherein said alignment posts are formed by the process of silicon nitride plug filling upon the silicon substrate.

Insulation Material Posts by Lift-Off—wherein said alignment posts are formed by the process of insulation material lift-off upon the said optical interference layer OIL.

Polyimide Posts by Photosensitive Etching—wherein said alignment posts are formed by the process of polyimide photosensitive etching upon the OIL.

BRIEF DESCRIPTION OF THE DRAWINGS

In the accompanying drawings forming a material part of this description, there is shown:

FIG. 5 shows a detailed cross-sectional diagram of the device ready to be covered with the optical interference layers.

FIG. 6 shows the optical interface layer deposition.

FIGS. 7 and 8 show the first method of the invention, that is the method that applies wet etch processing, as follows:

FIG. 9 shows the thick amorphous silicon deposition on top of the OIL.

FIG. 10 shows the result of post photomasking and plasma amorphous silicon etching.

FIG. 11 shows the deposition of a thick layer of oxide over the surface of the OIL as a first step in forming plasma plugs of silicon nitride.

FIG. 12 shows the result of post photomasking, plasma oxide etching and plasma enhanced nitride chemical vapor deposition.

FIG. 13 shows the result of silicon nitride etch-back and plasma oxide removal by applying wet etching.

FIG. 14 shows the results of the successive deposition of a thick layer of photoresist, a layer of silicon oxide (SiO) deposited by thermal evaporation and a thin layer of photoresist over the surface of the OIL, this in preparation for the creation of the insulation material posts.

FIG. 15 shows the result of the photomasking, plasma etching the SiO layer and another plasma etch of the bottom resist prior to the deposition of the insulation material.

FIG. 16 shows the cross-section after the thermal or electron beam evaporation of insulation material.

FIG. 17 shows the cross-section after the photoresist lift-off in an ultrasonic bath of resist remover.

FIG. 18 shows a cross-section after a layer of photosensitive polyimide has been deposited over the surface of the OIL.

FIG. 19 shows a cross-section after photomasking and development of the photosensitive polyimide for formation of alignment posts.

DESCRIPTION OF THE PREFERRED EMBODIMENTS

Figure 1:
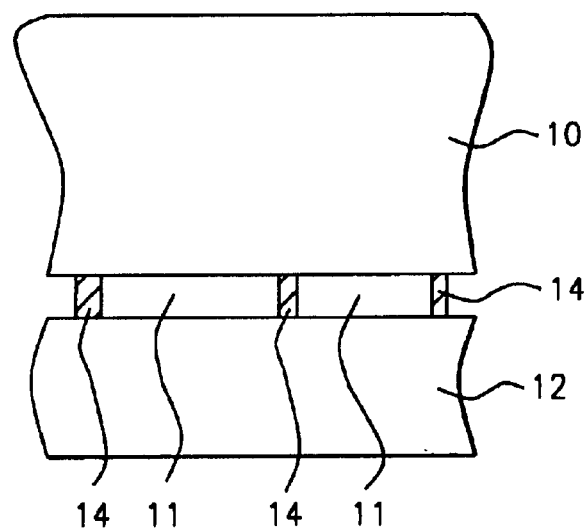
FIGS. 1 through 3 schematically illustrate in cross-sectional representation (FIG. 1) and top view (FIGS. 2 and 3) a preferred embodiment of the device structure of the present invention.

Referring now more particularly to FIG. 1, here is shown a portion of a partially completed integrated circuit liquid-crystal display. The glass cover plate 10 provides the transparent enclosure for the external incident light to be reflected back to an observer. The strength of reflected light is dependent on the light polarization, absorption and light scattering properties of each liquid-crystal display pixel, which is controlled by the electrical field established within the liquid crystal material 11. The IC die 12, separated from the glass plate by the alignment posts 14 generates these E-fields. The resultant space between the glass plate and the silicon wafer is filled with the chosen liquid crystal material. Light, either provided or ambient, enters the open face of the liquid-crystal-on silicon and is reflected from the underlying pixels to form a viewable pattern of polarized light, i.e. the image is viewed directly or projected through an optical polarized system.

Figure 2:
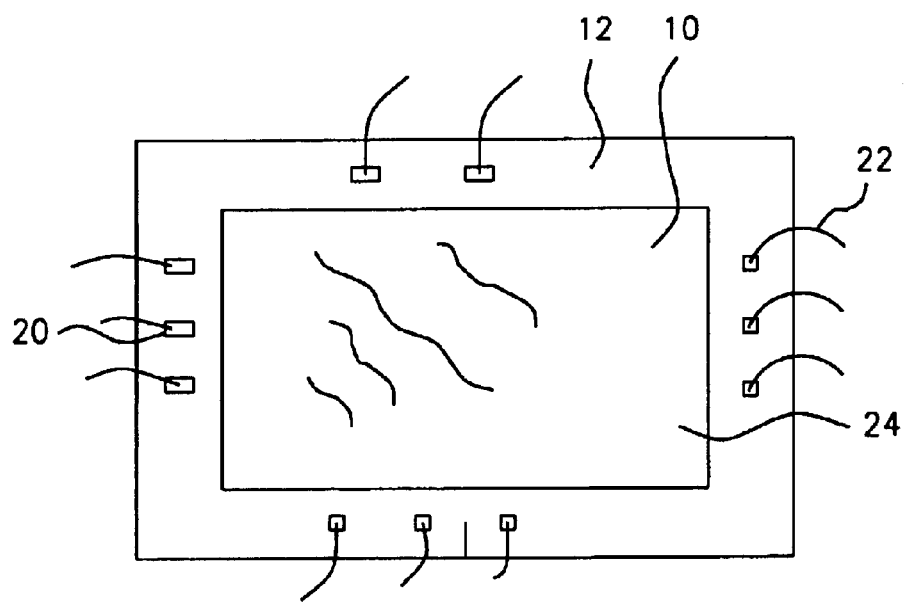
Figure 3:
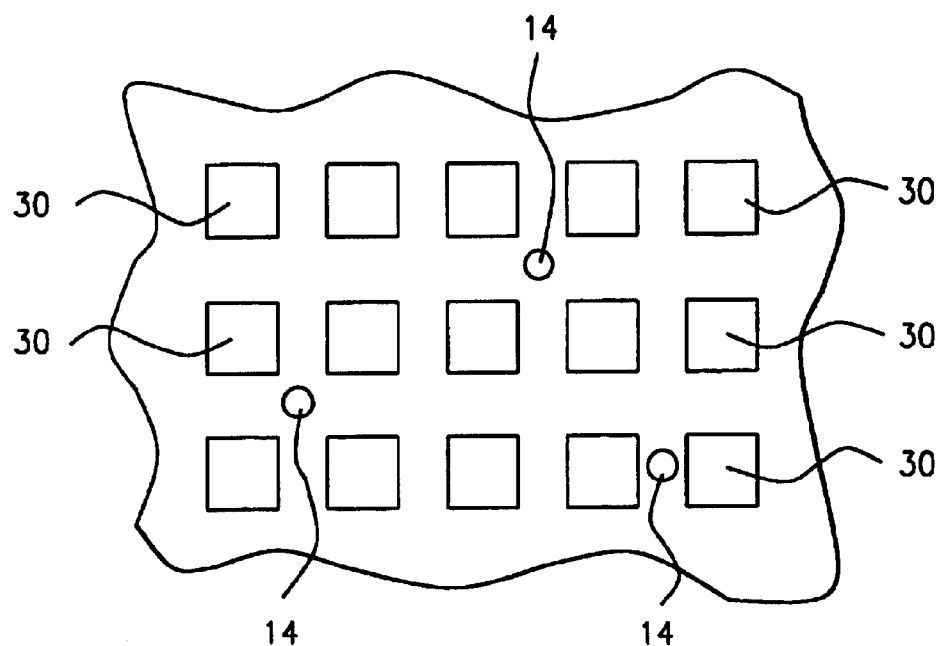

FIG. 2 illustrates the bonding pads 20 on the IC die to which the external wires 22 are attached. The silicon wafer contains the embedded control circuits that activate the pixel patterns in the viewable area 24. The optical properties of the liquid crystal (e.g. the rotation of plane-polarized light or the dispersion of light) are influenced by the electric fields above the IC surface. A small change in voltage makes a large change in the optical transmission. Because this invention teaches the photolithographic making of patterns of alignment posts, the ratio of pixels 30 to posts 14 is often fabricated in the range 1:1 to 1:10000. As shown in FIG. 3, the photolithographic method permits these alignment posts to be constructed in the space between adjacent pixels.

The processing steps for making the alignment posts and optical interference layers by means of the various methods of the invention are shown in FIGS. 4 to 20.

Figure 4:
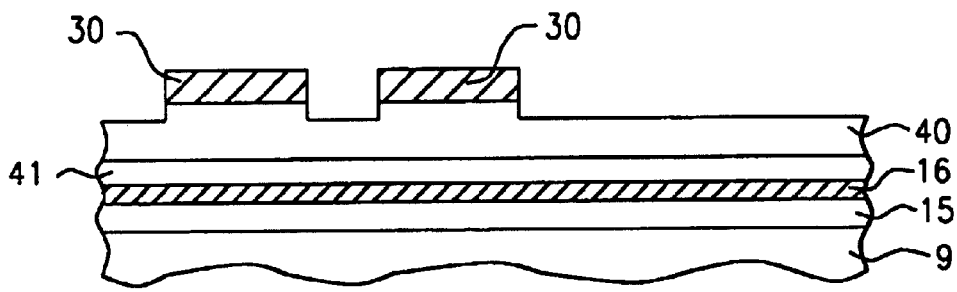
FIGS. 4 through 6 show the processing steps that are commonly shared between all five methods of the invention. The base silicon substrate with the formed metallic pixels on the display device is shown in FIG. 4.
Figure 5:
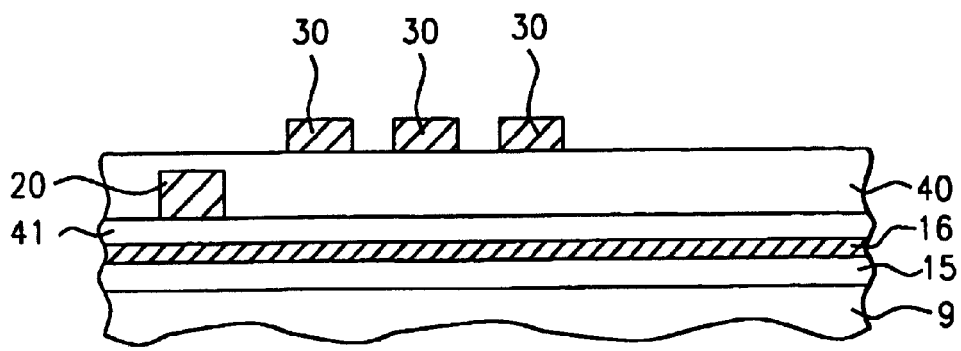

Starting with FIG. 4, there is shown the cross section of a substrate 9 on the surface of which a sequence of layers of semiconductor materials is deposited, as follows: the conductive metallic (or poly) layer 30 is formed over the layer 40 of silicon oxide, which is formed over the surface of a first metal layer 41, FIG. 5. Prior to formation of the layer 40 of silicon oxide, the metal bond pad 20, FIG. 5, is created on the surface of layer 41 of first level metal. The silicon semiconductor substrate 9 is coated with an insulating layer 16 of silicon dioxide and has active devices in layer 15 in or on the surface of substrate 9. Then a photoresist layer (not shown) is formed over the layer 30 of second metal to pattern and etch pixels 30. The photoresist (not shown) is exposed and a portion removed such that each pixel 30 retains a metallic layer, which acts as a mirror reflector for light incident upon pixel 30.

Figure 6:
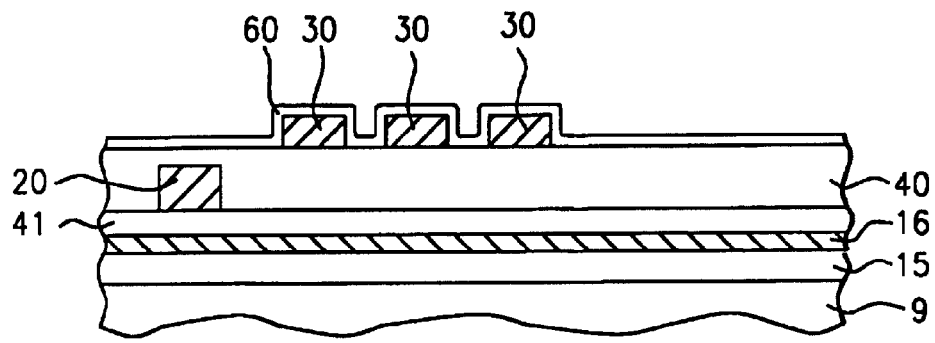

After the resist is stripped, as shown in FIG. 5, the device is ready to be covered with the optical interference layers 60. Optical interference layers are used to improve light reflections. Careful attention is required in constructing these optical interference layers so as not to disturb any underlying devices and/or posts. FIG. 6 shows the resultant structure, which is ready for the fabrication of alignment posts.

The processing steps that are presented in FIGS. 4 through 6 can be summarized as follows;

the process starts with a silicon semiconductor wafer 9 having a pattern 15 of active device structures therein and thereon (optionally) a layer 16 of insulation material is formed over the surface of wafer 9 a first metallic layer 41 is formed over the surface of the layer 16 of insulating material a second metallic layer 20 is formed over the surface of the silicon oxide insulation layer, this layer 20 is patterned and etched, forming bond pad 20 and interconnect points (not shown in FIGS. 4–6) over the surface of the first layer 41 of metal a silicon dioxide insulation layer 40 is formed over the first metallic layer 41, including the surface of the created bond pad 20 and interconnect points a third metallic layer 30 is formed over the surface of the silicon dioxide insulation layer 40 a photoresist mask (not shown in FIGS. 4–6) is formed over the third metallic layer 30, having a covering over the planned pixel locations of the liquid-crystal-on-silicon display device the third metallic layer 30 that is not covered by the photoresist mask is removed the photoresist mask is removed to provided such that each pixel 30 retains the metallic layer 30, which acts as a mirror reflector for light incident upon the liquid-crystal-on-silicon display device an optical interference layer 60, comprising silicon oxide/silicon nitride/silicon oxide/silicon nitride, is deposited over the patterned third metallic layer 30 and the silicon oxide layer 40, and openings are created through the optical interference layer 60 and the silicon-oxide insulation layer 40, these openings expose the surfaces of bond pad 20 and interconnections (not shown) created on the surface of the first layer 41 of metal.

The optical interference layer coating (OIL) is composed of oxides and nitrides, coated into multiple layers of insulating material with properties of varying optical indices of refraction. The alignment posts are constructed after the OIL is made by one of the five process methods described herein:

Method 1—Silicon Dioxide Posts by Wet Etching

Figure 7:
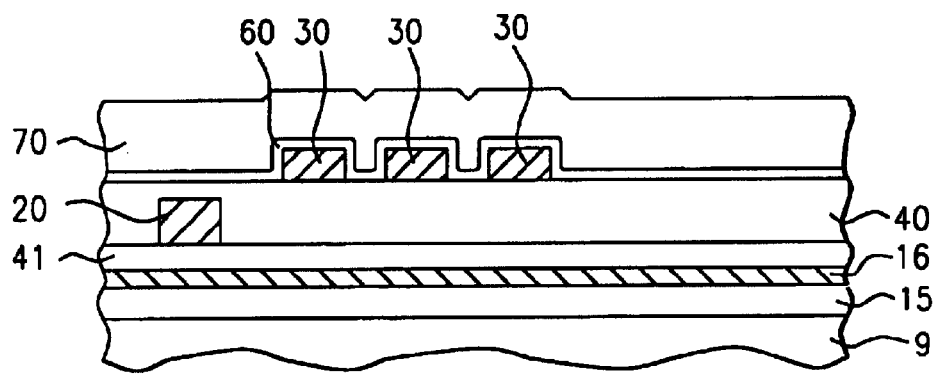
FIG. 7 shows the deposition of a thick layer of silicon oxide over the surface of the Optical Interface Layer (OIL).
Figure 8:
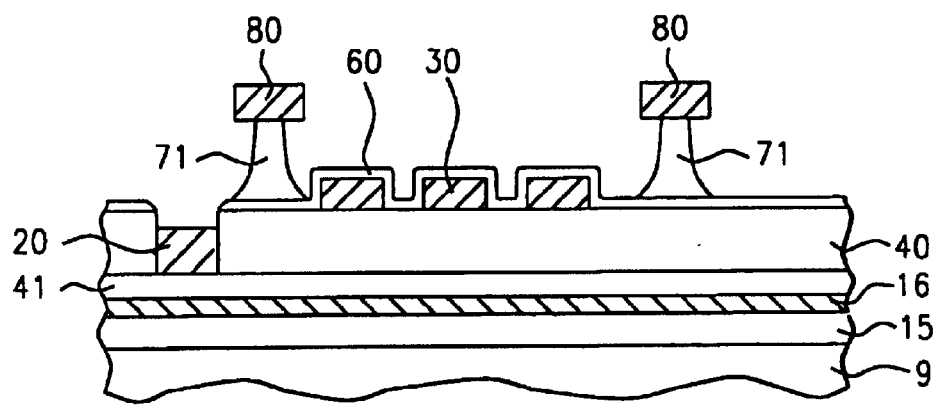
FIG. 8 shows the photomask after excess silicon oxide has been removed from the surface of the OIL by applying wet etch processing.

A silicon oxide layer 70, about 1 micron thick, is deposited on top of the OIL 60, as shown in FIG. 7. The photomask 80, about 4 microns across, is formed at the location of each alignment post, and a wet etch, such as hydrogen fluoride or buffered HF, is applied to remove the excess silicon oxide. The resultant alignment posts 71 are shown in FIG. 8 (in this illustration on the peripheral) After removing the alignment post photoresist, a photomask is deposited to make the metal bonding pad 20, and the said pad is etched into the OIL 60 plus silicon oxide 40, followed by the removal of this photomask and formation of the bond pads 20.

Method 2—Amorphous Silicon Posts by Plasma Etching

Figure 9:
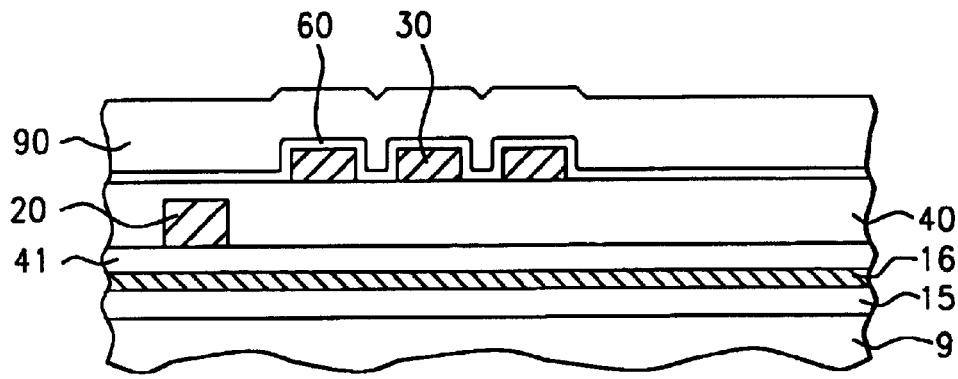
FIGS. 9 and 10 show the second method of the invention, that is the method that applies amorphous silicon plasma etching, as follows.
Figure 10:
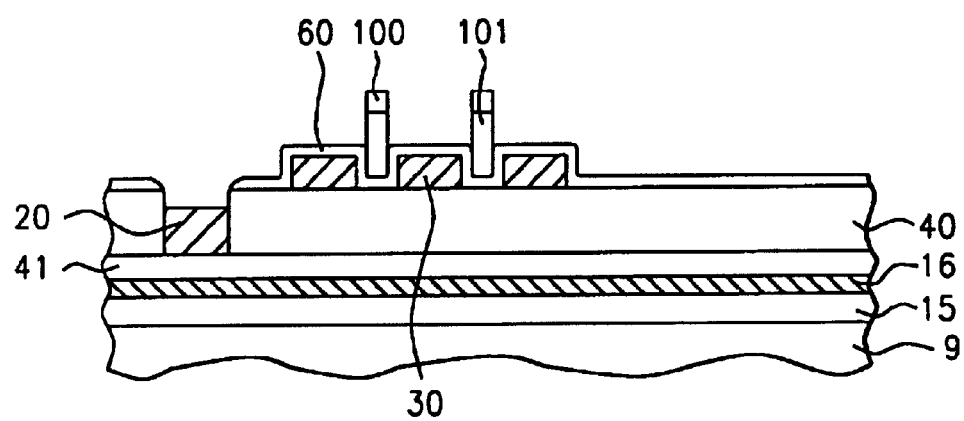

An amorphous silicon layer 90, about 1 micron thick, is deposited on top of the OIL 60, as shown in FIG. 9. The photomask 100, about 2 microns across, is formed at the location of each alignment post, and a plasma silicon etch, such as CF4/O2 or SF6, is applied to remove the excess amorphous silicon. This plasma etch has a high selectivity in the presence of silicon nitride, and will not damage the silicon nitride top layer in the OIL 60. The resultant alignment posts 101 are shown in FIG. 10 (in this illustration between the pixels). This process method is completed as described in Method 1, by removing the photoresist 80 and formation of the bond pads 20.

Method 3—Silicon Nitride Posts by Plug Filling

Figure 11:
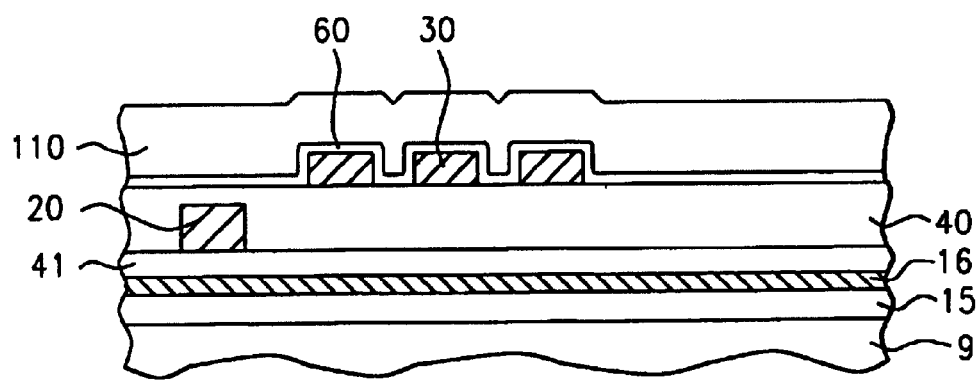
FIGS. 11 through 13 show the third method of the invention, that is the method that provides nitride plug filling, as follows.
Figure 12:
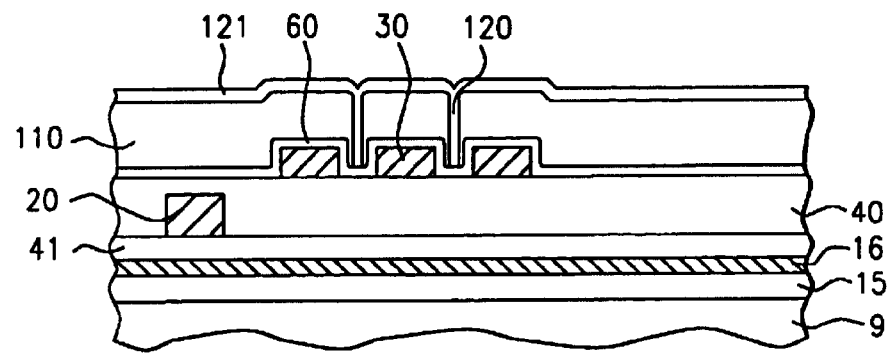

A silicon oxide layer 110, about 1 micron thick, is deposited on top of the OIL 60, as shown in FIG. 11. The photomask is formed over the oxide, except the location of each alignment post, and a plasma oxide etching is used to remove the silicon oxide not covered by the photomask, creating cavities 120, including some or all of the OIL at the base of the post cavity. Subsequently the post cavities 120 are filled with silicon nitride 121 deposited by plasma enhanced chemical vapor deposition (PECVD). The plasma enhancement provides low. temperature deposition of about 200 degrees centigrade lower than conventional PECVD deposition of a layer of silicon nitride. Without the plasma, the nitride deposition is in the range of 700 degrees centigrade.

Figure 13:
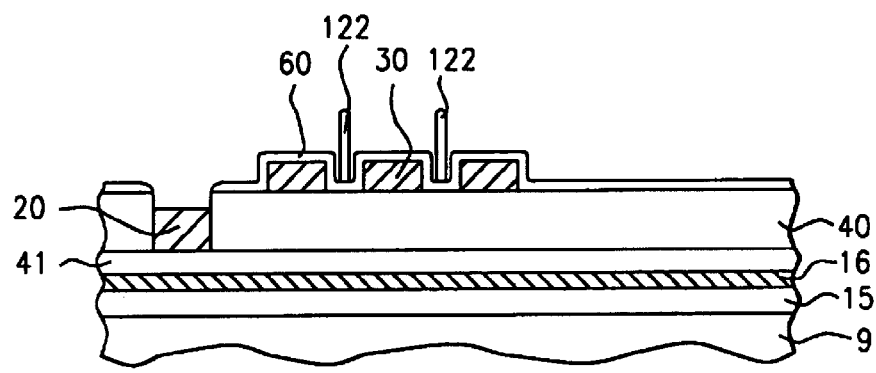

Subsequently a silicon nitride etch-back (also using a plasma etch) removes all the PECVD nitride except the cavity plugs 122. The plug filling of silicon nitride is not totally etched away by the plasma because the plasma etching is stopped after the nitride at the surface is removed. The remaining oxide 110 is removed with a wet etch, such as HF or buffered HF, as shown in FIG. 13. The wet etch does not remove the silicon nitride plugs because the selectivity between SiO2 and the nitride is infinite for HF etching, nor the OIL top layer because it is also a nitride. This process method is completed by formation of the exposed bond pads 20, as shown previously via a top sectional view in FIG. 2, and again later in a cross-sectional view in FIG. 20.

Method 4—Insulation Material Posts by Lift-off

Figure 14:
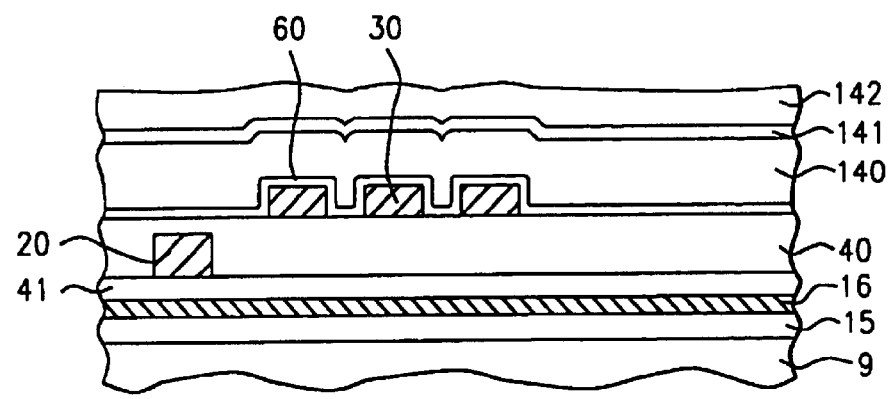
FIGS. 14 through 17 show the fourth method of the invention, that is the method that applies insulating material lift-off, as follows.
Figure 15:
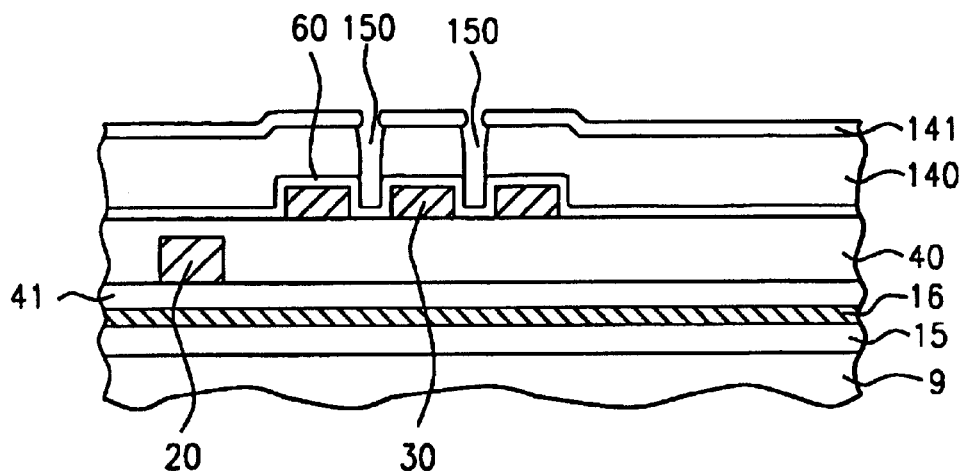
Figure 16:
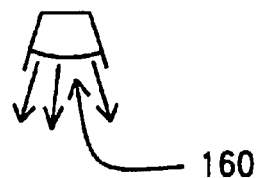
Figure 16:
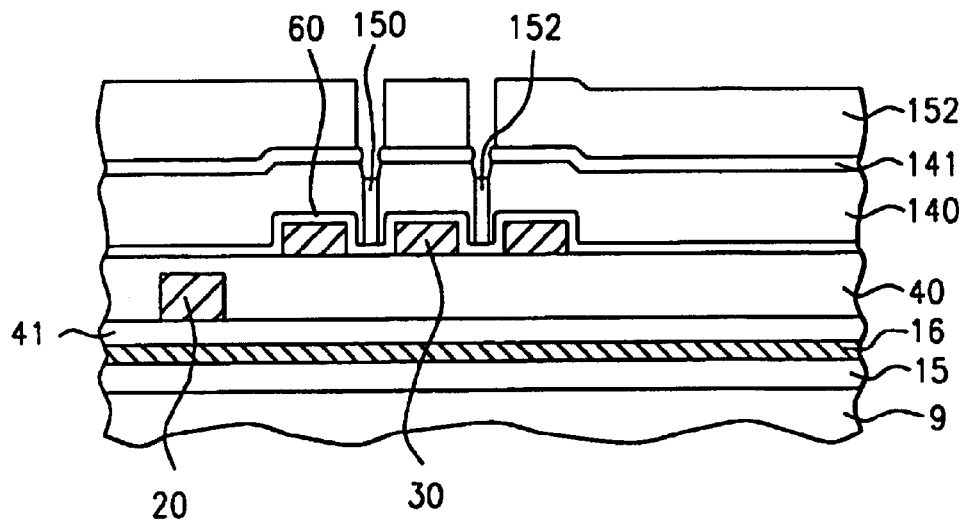
Figure 17:
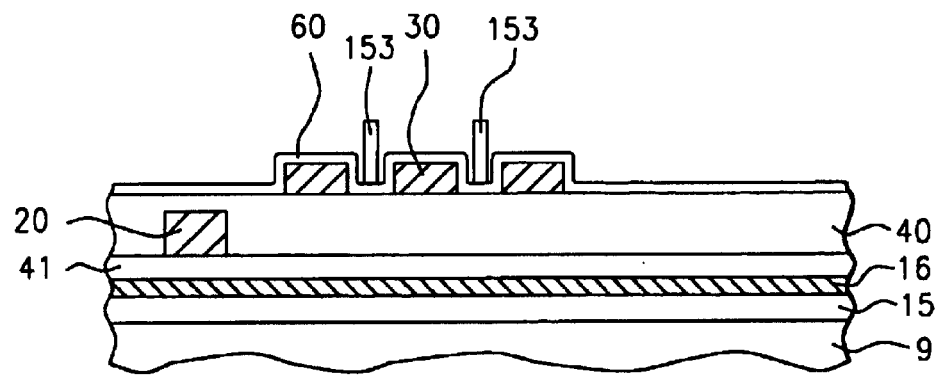

A photo resist or PMMA acylic layer 140, about two microns thick, is formed on top of the OIL, and a silicon monoxide layer 141 is placed over the photoresist 140 by thermal evaporation. These steps are followed by formation of another photoresist layer 142, about 1 micron thick, upon the silicon monoxide 141, as shown in FIG. 14. After photomasking the photoresist 142 is developed to expose the location of the plugs 150, the SiO layer 141 is etched with a CF4 plasma and the bottom photoresist 140 is etched with an oxygen plasma, as shown in FIG. 15. The cavities 150 in the bottom thicker photoresist are then filled with insulation material 152, (calcium fluoride, silicon monoxide, yttrium oxide, aluminum oxide) by thermal or electron beam evaporation; E-beam evaporation is shown in FIG. 16. The electron beam 160 is deviated by a magnetic field to strike on the material source, which is then evaporated and deposited onto the wafer. Control of the amount of the material evaporated is normally done by a crystal film thickness monitor. The bottom photoresist 140, silicon monoxide 141, and everything on top of SiO is removed by an acetone (or similar) ultrasonic bath, as shown in FIG. 17. The resist removal processing step does not affect the insulation material posts because these materials do not dissolve in acetone and stick well to the substrate. The posts made of insulation material are left among the pixels as shown, or around the peripheral as described in a prior method of this application. The process method is completed by formation of the bond pads 20.

Method 5—Polyimide Posts by Photosensitive Etching

Figure 18:
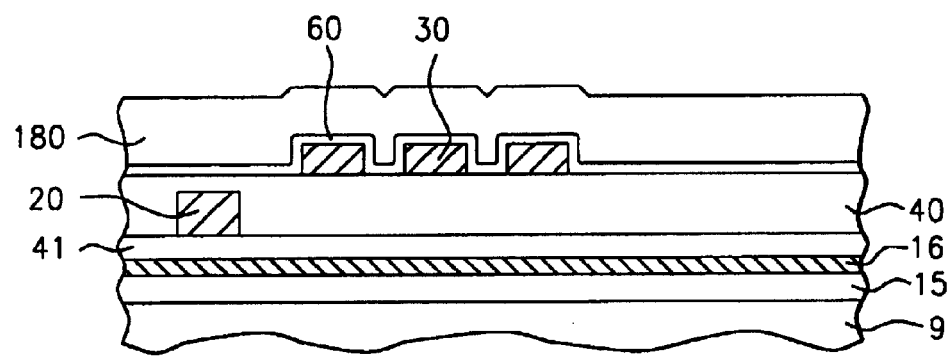
FIGS. 18 and 19 show the fifth method of the invention, that is the method that makes us of photosensitive polyimides, as follows.
Figure 19:
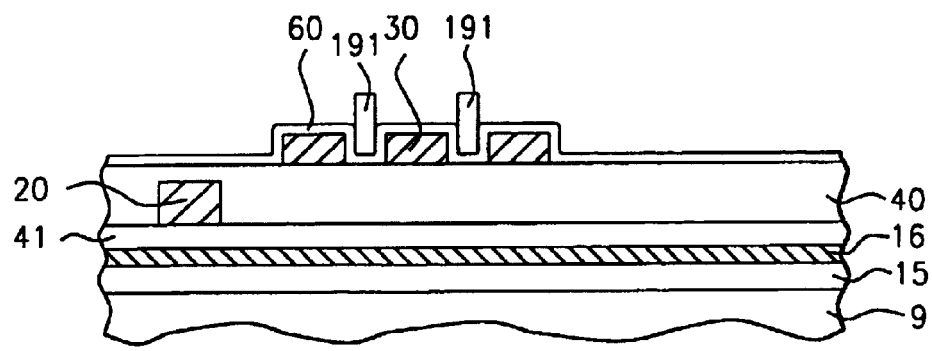

A photosensitive polyimide layer 180, about 1 micron thick, is formed on top of the OIL 60, as shown in FIG. 18. The photosensitive polyimide is deposited by spinning. This layer 180 is exposed to an UV light pattern so as to develop the polyimide to be used as the alignment post material. The unexposed photosensitive polyimide is then removed by development, as shown in FIG. 19, leaving the polyimide posts 191. This process method is completed by the formation of the bond pads 20.

Figure 20:
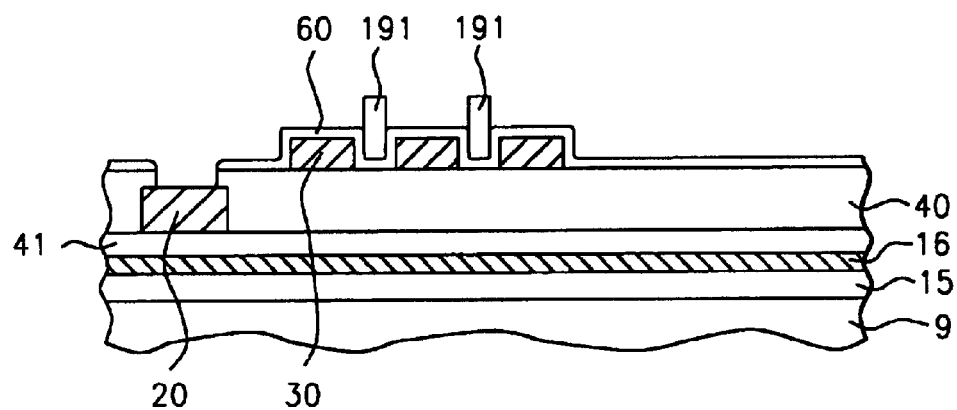
FIG. 20 shows a cross section of one embodiment of the present invention.

To complete the IC packaging, the IC is mounted onto a lead film and wires (22) are bonded from the legs of the lead film to the metal pad 20, as shown in FIG. 20.

Figures 21A, 21B:
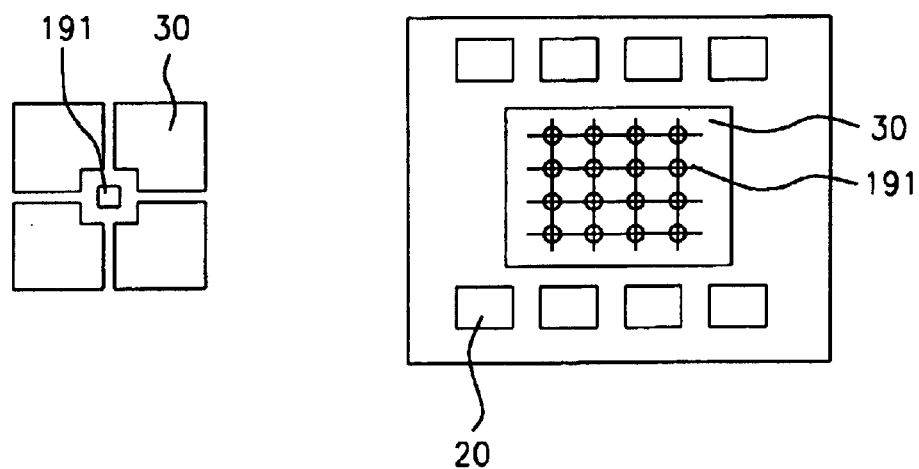
FIG. 21a and FIG. 21b illustrate (by means of a top view) how the display device can be constructed with the alignment posts between the pixels.

The top-view of one possible display device layout, shown in FIG. 21*a* and FIG. 21*b*, illustrates the location of the alignment posts, for example 191. While this drawing shows the posts 191 to be located among the metallic pixels 30, an alternative design would have some or all the alignment posts intermixed with the bonding pads 20 on the peripheral.

For all five methods of photolithographic formation of alignment posts on LCD-on-silicon display devices, the existence of numerous alignment posts permits the usage of an ultra-thin glass plate or cover over the liquid crystal. Both the worbpage of the wafer and the glass plate do not affect the thickness of the LCD material. This implementation results in lightweight displays for portable applications. Glass covers supported by alignment posts are typically 0.5 millimeters in thickness, and can range from 0.1 mm to 2 mm.

The invention, which provides a method of forming a device structure that combines insulating materials for alignments posts and optical interference layers associated with an active device structure in a silicon body, can be summarized as follows:

providing a silicon wafer having a pattern of active device structures therein and thereon forming a first metallic layer over the surface of said wafer forming a second metallic layer over said first metallic layers, which is used both for connections and for bonding pads forming a silicon dioxide insulation over said second metallic layer forming a third metallic layer over said layer of silicon dioxide forming a photoresist mask over said third metallic layer having a covering over planned pixel locations of said liquid-crystal-on-silicon display device removing said third metallic layer not covered by said photoresist mask removing said photoresist mask to provide that each said pixel retains said third metallic layer, which shall act as a mirror reflector for light incident upon said liquid-crystal-on-silicon display device depositing optical interference layers of silicon oxide or silicon nitride over said third metallic layer and said silicon dioxide layer, and forming said alignment posts whereby said alignment post are formed by the process of amorphous silicon by plasma etching upon said silicon substrate.

Additional steps can be provided of:

forming an amorphous silicon layer of thickness between about 0.1 and 5 microns to achieve the desired height of the alignment posts forming a photoresist mask over said amorphous silicon layer to cover the location of each planned alignment post removing said amorphous silicon to form said alignment posts by plasma etch, and removing said photoresist mask.

The invention can first alternately be summarized as comprising the steps of:

providing a silicon wafer having a pattern of active device structures therein and thereon forming a first metallic layer over the surface of said wafer forming a second metallic layer over said first metallic layer, which is used both for connections and for bonding pads forming a silicon dioxide insulation over said second metallic layer forming a third metallic layer over said layer of silicon dioxide forming a photoresist mask over said third metallic layer having a covering over planned pixel locations of said liquid-crystal-on-silicon display device removing said third metallic layer not covered by said photoresist mask removing said photoresist mask to provide that each said pixel retains said third metallic layer, which shall act as a mirror reflector for light incident upon said liquid-crystal-on-silicon display device depositing optical interference layers of silicon oxide or silicon nitride over said third metallic layer and said silicon dioxide layer, and forming said alignment posts by the process of silicon nitride by plug filling upon the silicon substrate.

The first alternate of the invention can further be expanded by:

forming a PECVD oxide layer of thickness between 0.1 and 5 microns to achieve the desired height of the alignment posts forming a photoresist mask over said PECVD oxide layer to expose the location of each planned alignment post forming post cavities by plasma etching of said PECVD oxide layer plasma enhanced chemical vapor deposition of silicon nitride into said post cavities etch-back removal of said silicon nitride, except that silicon nitride deposited in said post cavities removing the PECVD oxide layer by wet etch (such as HF or buffered HF) to form said silicon nitride alignment posts, and removing said photoresist mask.

The invention can second alternately be summarized as comprising the steps of:

providing a silicon wafer having a pattern of active device structures therein and thereon forming a first metallic layer over the surface of said wafer forming a second metallic layer over said first metallic layer, which is used both for connections and for bonding pads forming a silicon dioxide insulation over said second metallic layer forming a third metallic layer over said layer of silicon dioxide forming a photoresist mask over said third metallic layer having a covering over planned pixel locations of said liquid-crystal-on-silicon display device removing said third metallic layer not covered by said photoresist mask removing said photoresist mask to provide that each said pixel retains said third metallic layer, which shall act as a mirror reflector for light incident upon said liquid-crystal-on-silicon display device depositing optical interference layers of silicon oxide or silicon nitride over said third metallic layer and said silicon dioxide layer and forming said alignment post by the process of insulation material by lift-off upon said optical interference layer OIL.

The second alternate of the invention can further be expanded by:

depositing a two-micron bottom photoresist layer or PMMA acylic layer upon the OIL and covered by silicon monoxide via thermal evaporation, followed by another photoresist layer using a photomask is to form cavities in said silicon monoxide by a CF4 plasma etching of the silicon monoxide, after which the silicon monoxide serves as a mask for an oxygen plasma etching of said two-micron bottom photoresist or PMMA acylic layer forming an insulation material by plug filling the cavities formed in the silicon monoxide and two-micron bottom photoresist layer or PMMA acylic layer; several insulation materials are available from which to choose, including calcium fluoride, silicon monoxide, yttrium oxide, and aluminum oxide, and the like removing said bottom photoresist layer or PMMA acylic layer by lift-off with an ultrasonic bath, leaving said alignment posts.

The invention can third alternately be summarized as comprising the steps of:

providing a silicon wafer having a pattern of active device structures therein and thereon forming a first metallic layer over the surface of said wafer forming a second metallic layer over said first metallic layer, which is used both for connections and for bonding pads forming a silicon dioxide insulation over said second metallic layer forming a third metallic layer over said layer of silicon dioxide forming a photoresist mask over said third metallic layer having a covering over planned pixel locations of said liquid-crystal-on-silicon display device removing said third metallic layer not covered by said photoresist mask removing said photoresist mask to provide that each said pixel retains said third metallic layer, which shall act as a mirror reflector for light incident upon said liquid-crystal-on-silicon display device depositing optical interference layers of silicon oxide or silicon nitride over said third metallic layer and said silicon dioxide layer; and forming said alignment post by a process of polyimide by photosensitive etching upon an Optical Interference Layer (OIL).

The third alternate of the invention can further be expanded by:

forming a photosensitive polyimide layer of thickness between about 0.1 and 5 microns to achieve the desired height of the alignment posts exposing said photosensitive polyimide at the location of each planned alignment post developing and removing said photosensitive polyimide to leave said alignment posts in the location of the exposed polyimide described herein, and removing said photoresist mask.

While the invention has been particularly shown and described with reference to the preferred embodiments thereof, it will be understood by those skilled in the art that various changes in form and details may be made without departing from the spirit and scope of the invention.

What is claimed is:

1. A method of forming a device structure that combines insulating materials for alignments posts and optical interference layers associated with an active device structure in a silicon body comprising:

providing a silicon wafer having a pattern of active device structures therein and thereon;

forming a first metallic layer over the surface of said wafer;

forming a second metallic layer over said first metallic layer, which is used both for connections and for bonding pads;

forming a silicon dioxide insulation over said second metallic layer;

forming a third metallic layer over said layer of silicon dioxide;

forming a photoresist mask over said third metallic layer having a covering over planned pixel locations of said liquid-crystal-on-silicon display device;

removing said third metallic layer not covered by said photoresist mask;

removing said photoresist mask to provide that each said pixel retains said third metallic layer, which shall act as a mirror reflector for light incident upon said liquid-crystal-on-silicon display device;

depositing optical interference layers of silicon oxide or silicon nitride over said third metallic layer and said silicon dioxide layer; and forming said alignment posts whereby said alignment post are formed by the process of amorphous silicon by plasma etching upon said silicon substrate.

2. The method of claim 1 further comprising forming an amorphous silicon layer of thickness between about 0.1 and 5 microns to achieve the desired height of the alignment posts.

3. The method of claim 1 further comprising forming a photoresist mask over said amorphous silicon layer to cover the location of each planned alignment post.

4. The method of claim 1 further comprising removing said amorphous silicon to form said alignment posts by plasma etch, and removing said photoresist mask.

5. A method of forming a device structure that combines insulating materials for alignments posts and optical interference layers associated with an active device structure in a silicon body comprising:

providing a silicon wafer having a pattern of active device structures therein and thereon;

forming a first metallic layer over the surface of said wafer;

forming a second metallic layer over said first metallic layer, which is used both for connections and for bonding pads;

forming a silicon dioxide insulation over said second metallic layer;

forming a third metallic layer over said layer of silicon dioxide;

forming a photoresist mask over said third metallic layer having a covering over planned pixel locations of said liquid-crystal-on-silicon display device;

removing said third metallic layer not covered by said photoresist mask;

removing said photoresist mask to provide that each said pixel retains said third metallic layer, which shall act as a mirror reflector for light incident upon said liquid-crystal-on-silicon display device;

depositing optical interference layers of silicon oxide or silicon nitride over said third metallic layer and said silicon dioxide layer; and forming said alignment posts by the process of silicon nitride by plug filling upon the silicon substrate.

6. The method of claim 5 further comprising forming a PECVD oxide layer of thickness between 0.1 and 5 microns to achieve the desired height of the alignment posts.

7. The method of claim 6 further comprising forming a photoresist mask over said PECVD oxide layer to expose the location of each planned alignment post.

8. The method of claim 7 further comprising forming post cavities by plasma etching of said PECVD oxide layer.

9. The method of claim 8 further comprising plasma enhanced chemical vapor deposition of silicon nitride into said post cavities.

10. The method of claim 9 further comprising etch-back removal of said silicon nitride, except that silicon nitride deposited in said post cavities.

11. The method of claim 10 further comprising removing the PECVD oxide layer by wet etch (such as HF or buffered HF) to form said silicon nitride alignment posts, and removing said photoresist mask.

* * * * *